United States Patent [19]

Maher, Jr. et al.

[11] Patent Number: 5,582,755

[45] Date of Patent: Dec. 10, 1996

[54] APPARATUS AND METHOD FOR CLASSIFYING A MEDIUM IN A COOKING CHAMBER

[75] Inventors: Charles A. Maher, Jr., Stratford, Conn.; Raymond Larrick, Kent, Ohio

[73] Assignee: Tridelta Industries, Inc., Mentor, Ohio

[21] Appl. No.: 416,047

[22] Filed: Apr. 4, 1995

[51] Int. Cl.$^6$ ........................................... H05B 1/02
[52] U.S. Cl. ..................... 219/492; 219/497; 219/506; 219/508; 99/330; 340/589
[58] Field of Search ............................. 291/494, 497, 291/501, 506, 492, 508; 340/588, 589; 99/329 R, 325, 344, 330, 331; 73/25.01

[56] References Cited

U.S. PATENT DOCUMENTS

| | | | |
|---|---|---|---|
| Re. 29,609 | 4/1978 | Wadia et al. | 219/494 |
| 3,094,875 | 6/1963 | Fluegel | 73/359 |
| 3,217,633 | 11/1965 | Anetsberger | 99/327 |
| 3,326,692 | 6/1967 | Martino et al. | 99/111 |
| 3,525,299 | 8/1970 | Gouwens | 99/336 |
| 3,665,159 | 5/1972 | Becker et al. | 219/497 |
| 3,694,669 | 9/1972 | Witt et al. | |
| 3,732,468 | 5/1973 | Witt et al. | |
| 3,800,779 | 4/1974 | Moore et al. | |
| 3,863,049 | 1/1975 | Hinman | 219/389 |
| 3,866,472 | 2/1975 | Witt | |
| 3,870,859 | 3/1975 | Price | |
| 3,904,852 | 9/1975 | Rivelli et al. | |
| 3,911,250 | 10/1975 | Price | |
| 3,924,101 | 12/1975 | Beard | 219/490 |
| 3,938,498 | 2/1976 | Price | |
| 3,950,632 | 4/1976 | Rivelli | |
| 3,955,067 | 5/1976 | Eldridge | 219/497 |
| 3,979,056 | 9/1976 | Barnes | |
| 3,998,146 | 12/1976 | Price | |
| 4,032,749 | 6/1977 | Price | |
| 4,036,995 | 7/1977 | Koether et al. | |
| 4,058,703 | 11/1977 | Price | |
| 4,077,690 | 3/1978 | Koether | |
| 4,097,707 | 6/1978 | Kobayashi et al. | 219/10.55 B |
| 4,195,667 | 4/1980 | Moore et al. | |
| 4,197,581 | 4/1980 | Watrous et al. | 364/400 |
| 4,206,872 | 6/1980 | Levine | 236/46 R |
| 4,210,123 | 7/1980 | Moore et al. | |
| 4,210,177 | 7/1980 | Moore et al. | |
| 4,259,567 | 3/1981 | Moore et al. | |
| 4,278,872 | 7/1981 | Koether et al. | |
| 4,282,423 | 8/1981 | Volz | 219/490 |
| 4,296,632 | 10/1981 | Bloomer et al. | 73/362 A R |
| 4,301,509 | 11/1981 | Haase et al. | 364/557 |
| 4,304,177 | 12/1981 | Loeffler et al. | 99/333 |
| 4,320,285 | 3/1982 | Koether | 219/497 |
| 4,324,173 | 4/1982 | Moore et al. | |
| 4,362,094 | 12/1982 | Polster | 99/342 |

(List continued on next page.)

FOREIGN PATENT DOCUMENTS 2011677   7/1979   United Kingdom.

OTHER PUBLICATIONS

Omega Catalog, 1989, pp. P–5–P–8, P–10, P–11.
Ziemacki, Mike, "Fuzzy Logic Microcontroller," ECN.

*Primary Examiner*—Mark H. Paschall
*Attorney, Agent, or Firm*—D. Peter Hochberg; Mark Kusner; Michael Jaffe

[57] ABSTRACT

A deep fat fryer includes a controller operatively connected to a heating element for controlling the operation thereof to apply heat to a cooking chamber. A temperature sensor is disposed in the cooking chamber for measuring the temperature in the cooking chamber and communicating the same to the controller. The controller selectively operates the heating means to apply heat to the cooking chamber. Utilizing the output of the temperature sensor, the controller automatically determines whether the medium contained in the cooking chamber is water, liquid shortening or solid shortening or whether the cooking chamber is empty. Based on this determination, the controller takes appropriate action including, automatically adjusting its operation to conform to the detected medium

8 Claims, 10 Drawing Sheets

U.S. PATENT DOCUMENTS

| | | | |
|---|---|---|---|
| 4,377,733 | 3/1983 | Yamaguchi et al. | 219/10.55 B |
| 4,379,964 | 4/1983 | Kanazawa et al. | 219/492 |
| 4,401,884 | 8/1983 | Kusunoki et al. | 219/492 |
| 4,420,006 | 12/1983 | Moore et al. . | |
| 4,437,159 | 3/1984 | Waugh . | |
| 4,455,480 | 6/1984 | Matsumoto et al. | 219/497 |
| 4,465,228 | 8/1984 | Mori et al. | 236/20 A |
| 4,503,320 | 3/1985 | Polster | 219/441 |
| 4,549,527 | 10/1985 | Davis . | |
| 4,551,618 | 11/1985 | Payne | 219/510 |
| 4,570,054 | 2/1986 | Chidzey et al. | 219/490 |
| 4,585,925 | 4/1986 | Andre | 219/497 |
| 4,601,004 | 7/1986 | Holt et al. | 364/557 |
| 4,636,949 | 1/1987 | Longabaugh | 364/400 |
| 4,663,710 | 5/1987 | Waugh et al. . | |
| 4,672,540 | 6/1987 | Waugh et al. . | |
| 4,688,475 | 8/1987 | Witt et al. . | |
| 4,740,888 | 4/1988 | Ceste, Sr. et al. . | |
| 4,742,455 | 5/1988 | Schreyer . | |
| 4,782,445 | 11/1988 | Pasquini . | |
| 4,812,625 | 3/1989 | Ceste, Sr. . | |
| 4,812,963 | 3/1989 | Albrecht et al. . | |
| 4,818,348 | 4/1989 | Stetter | 204/1 T |
| 4,845,978 | 7/1989 | Whitford | 73/73 |
| 4,858,119 | 8/1989 | Waugh et al. . | |
| 4,864,498 | 9/1989 | Pasquini et al. . | |
| 4,911,068 | 3/1990 | Koether et al. . | |
| 4,913,038 | 4/1990 | Burkett et al. . | |
| 4,968,515 | 11/1990 | Burkett et al. . | |
| 4,978,837 | 12/1990 | Eggleston | 219/497 |
| 5,043,860 | 8/1991 | Koether et al. . | |
| 5,044,262 | 9/1991 | Burkett et al. . | |
| 5,052,819 | 10/1991 | Baratta | 374/43 |
| 5,060,559 | 10/1991 | Winter . | |
| 5,170,042 | 12/1992 | Bunn | 219/497 |
| 5,220,864 | 6/1993 | Ejiri et al. . | |
| 5,235,148 | 8/1993 | Yamaguchi et al. . | |
| 5,240,725 | 8/1993 | Akamatsu et al. | 426/233 |
| 5,352,866 | 10/1994 | Cartwright et al. . | |

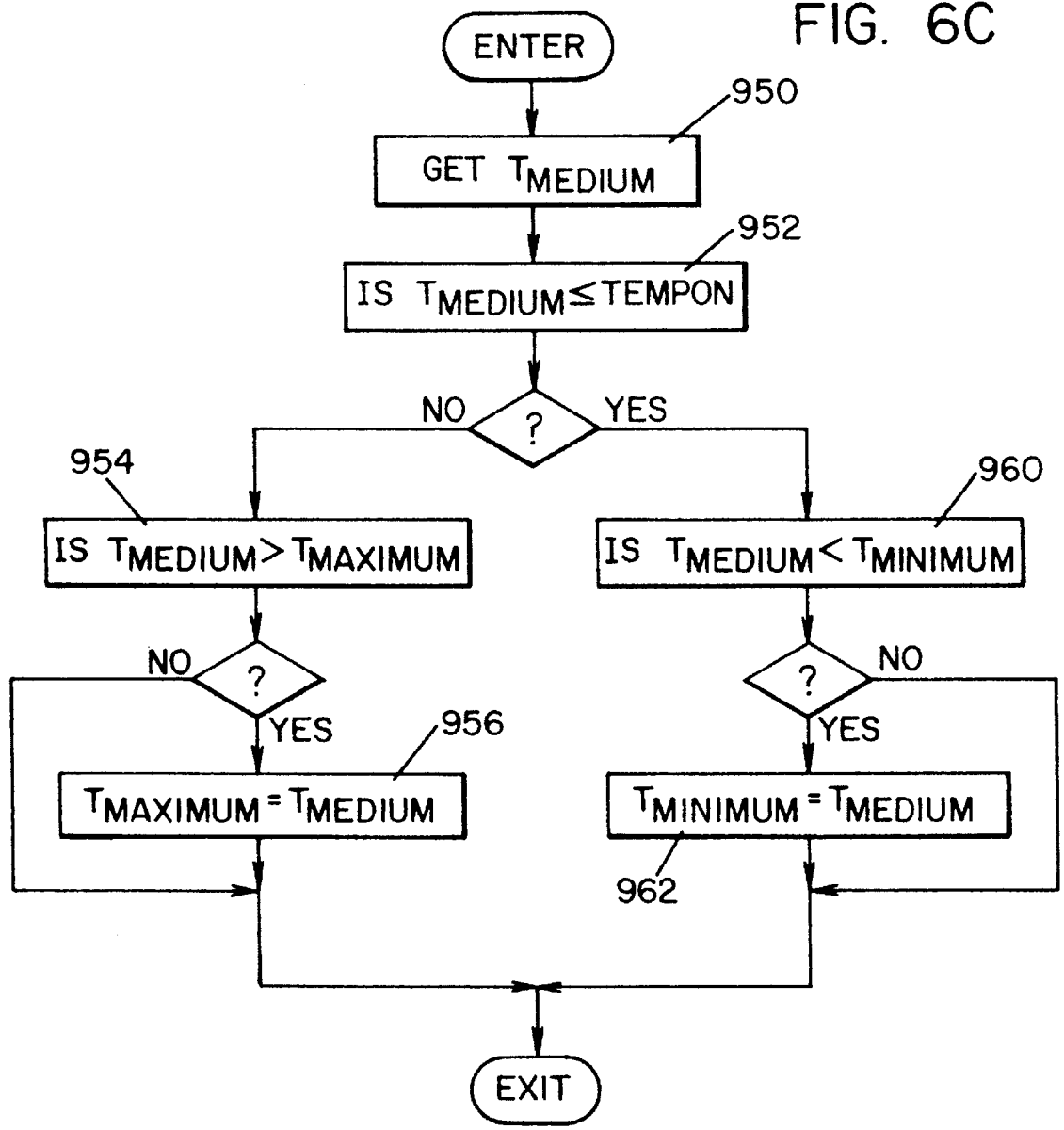

APPARATUS AND METHOD FOR CLASSIFYING A MEDIUM IN A COOKING CHAMBER

FIELD OF INVENTION

The present invention relates generally to an electronic control system, and more particularly to a control system for use with a heating apparatus.

The present invention finds advantageous application to a deep fat fryer cooking system and will be described with particular reference thereto, it being appreciated that the present invention has broader applications and may be used with other heating apparatus such as ovens, pressure cookers, pasta cookers, holding cabinets, furnaces, and water heaters.

BACKGROUND OF THE INVENTION

It has been found that certain food products cook and taste best when heated at a specific temperature for a set period of time. As a result, restaurants and food service establishments, especially franchise food chains, have instituted strict criteria for preparation of fried food products. Consequently, restaurants and food service establishments will often require a deep fat fryer which can operate and maintain specific heating parameters.

Deep fat fryers are widely used in commercial food vending establishments, such as fast food restaurants, to heat food products, such as potatoes, fish, chicken, or the like. Accordingly, desirable characteristics in a deep fat fryer include rapid heating, without overshoot, to an operator selected cooking temperature, accurate maintenance of the cooking medium temperature to a temperature within a narrow range around the operator selected cooking temperature, minimal wearing of heating element components, and safety features which prevent injury to the operator or damage to the fryer.

Prior art fryers known heretofore typically include a vat for holding a cooking medium, temperature selection means for inputting a desired cooking temperature for a food product, a heating element (e.g., a gas burner or electric element) for heating the cooking medium, temperature sensing means for sensing the temperature of the cooking medium, and a fryer controller for providing overall control of fryer operations. One significant function performed by the fryer controller is control of the heating element.

The heating element is operated in a melt mode, a post-melt mode, an idle mode, a cook mode, and a boil mode. In the melt mode, a "cold" cooking medium is heated at a slow rate to gradually introduce heat to the cooking medium. Since many cooking mediums are solid at room temperature, special care must be taken in operating the fryer to melt the cooking medium. When solid cooking mediums are quickly heated, hot spots can develop which may damage the fryer and which may scorch the cooking medium, making it unsuitable for use in cooking. Fire or heavy smoking are also possible results of quick heating of said cooking mediums.

The post-melt mode quickly heats the cooking medium to reach an operator selected setpoint temperature (i.e., cooking temperature) which is optimum for cooking the food product.

The cooking medium is maintained at a temperature around the operator selected setpoint temperature in the idle mode. In this mode of operation, the fryer awaits introduction of food product into the vat.

In the cook mode, food product is introduced into the cooking medium, and depending on the load size, may cause a drastic drop in the temperature of the cooking medium. It is during this mode that the food product is cooked.

In a boil mode, the cooking medium is removed from the vat so that a cleaning operation can take place. In this respect, water and detergent are introduced into the vat and heated to a predetermined temperature (e.g., approximately 195° F.).

Referring now to the melt mode, prior art systems turn the heating element on at constant intervals (i.e., pulse) to gradually introduce heat energy into the cooking medium. Once a predetermined melt-release temperature is reached the melt-mode ends, since the cooking medium may now be quickly heated to the operator selected setpoint temperature without any adverse effects.

With respect to the post-melt mode, the prior art utilizes generally two approaches. In the first approach, the heating element is turned unconditionally on (i.e., full ON), until the temperature of the cooking medium exceeds a predetermined threshold temperature a predetermined number of degrees below the operator selected setpoint temperature. Once the cooking medium has exceeded the threshold temperature, the fryer controller begins pulsing the heating element.

In a second approach to the post-melt mode, the heating element is turned full ON until a predetermined threshold temperature is reached. When the cooking medium reaches this threshold temperature, the heating element is turned off, and the internal heat capacity of the fryer is relied upon to cause the temperature of the cooking medium to continue rising until reaching the operator selected setpoint temperature.

With regard to the idle mode, prior art systems employ several different approaches. A first approach is known as ON/OFF control. The heating element is either on or off, with no middle state. The heating element is ON when the temperature of the cooking medium is below the operator selected setpoint temperature, and OFF when the cooking medium temperature is above the setpoint temperature. A second approach is known as proportional control. The proportioning action occurs within a "proportional band" around the setpoint temperature. Outside this band, the controller functions as an ON/OFF unit, with the heating element either fully ON (below the band) or fully OFF (above the band). However, within the band, the heating element is turned on and off for short intervals, wherein the ratio of ON time to OFF time is varied based upon the difference between the cooking medium temperature and the setpoint temperature. A third approach is known as PID (proportional with integral and derivative control). PID combines proportional control with two additional adjustments, which help compensate to changes in the system. Integral determines how long the cooking medium temperature has been below the setpoint temperature, and derivative determines how fast (i.e., the rate) the cooking medium temperature is changing.

One feature common to many prior art idle mode control strategies is that they attempt to minimize the peak-to-valley excursions of the cooking medium temperature. The peak-to-valley excursion is the range of cooking medium temperatures obtained around the setpoint temperature. The maximum temperature establishes the "peak," while the minimum temperature establishes the "valley." The peak-to-valley excursion of the cooking medium temperature is usually minimized by periodically pulsing the heating element, wherein the pulses have a fixed duty cycle. In this respect, the pulses of heat are intended to add the heat necessary to balance the heat lost to the surrounding environment.

Referring now to the cook mode, the controller of prior art systems keeps the heating element unconditionally on during the entire cook mode when a "full load" has been introduced into the cooking medium.. A full load is a load of food product which is at or near the maximum load size for the fryer. Prior art systems operate in this manner because introduction of food product typically causes a drastic drop in the temperature of the cooking medium. However, when several cook modes are initiated successively, there is a build up of stored energy in the fryer. Thus, it is possible to overshoot the operator selected setpoint temperature when an interval of time elapses between a series of cooks and sufficient energy has built up. Furthermore, when a series of cooks are initiated, the bottom temperature (i.e., the minimum temperature of the cooking medium reached after the introduction of food product to the cooking medium) will rise with each successive cook. This also occurs due to heat build-up. Thus, each successive cook mode operation will not be uniform. As noted above, prior art systems operate unconditionally ON throughout each "full load" cook mode, and consequently do not dissipate any excess heat.

With regard to the boil mode, which is provided to carry out a vat cleaning procedure, prior art systems require the operator to manually enter this mode. In this respect, prior art controllers do not sense when water has been substituted for the cooking medium in the vat.

There are drawbacks to the operation of the prior art systems in each mode of operation. With respect to the melt mode, the prior art generally operates the same irrespective of the type of cooking medium. However, it would be advantageous to use different rates of heating depending on the type of cooking medium being used. In this respect, liquid shortening can accept heat at a faster rate, without any adverse affects, than can solid shortening. The prior art fails to provide a controller which can heat the cooking medium more rapidly or bypass the melt mode altogether and begin the post-melt mode at once, when the cooking medium can accept heat at a faster rate. This approach would allow for quicker initial heating of the cooking medium. However, it is also noted that in the case of solid shortening, an unsafe condition can result from bypassing the melt mode. Possible results of rapid heating include damage to the quality of the shortening itself, heavy smoking or fire. Accordingly, the prior art also fails to provide a controller which can recognize the type of cooking medium in the vat in order to avoid unsafe conditions.

There are also disadvantages to the prior art post-melt mode, wherein the heating element is continuously on followed by pulses of heat until it reaches a predetermined threshold temperature below the operator selected setpoint temperature. In this respect, pulsing might not be needed or desired depending on the operating conditions and system parameters. For example, if the temperature of the shortening is close enough to the setpoint temperature when the continuous heating is terminated, then the internal heat capacity of the fryer may be capable of raising the cooking medium temperature to the setpoint temperature. This phenomenon is commonly referred to as "thermal lag," and can cause the temperature of the cooking medium to arrive at the setpoint temperature without the further application of heat. Furthermore, in some cases, the pulses of heat may not be sufficient to raise the temperature of the cooking medium to the setpoint temperature. This problem may arise because the duration of each heat pulse is not long enough to overcome heat loss to the surrounding environment. Accordingly, the prior art does not have the ability to adapt to post-melt mode conditions which may differ each time the post-melt mode occurs.

The alternative prior art approach to the post-melt mode, wherein continuous heating is followed by a heat cutoff, has similar drawbacks. In this respect, the prior art does not provide for an adjustable heat cutoff temperature. The heat cutoff temperature should vary, since the resulting peak temperature obtained after the heat cutoff cannot be assured each time the post-melt mode occurs. In this respect, the prior art does not adjust the cutoff temperature for different post-melt mode conditions which may be present.

In general, the prior art approaches fail to provide a controller having a post-melt mode wherein the threshold temperature is modifiable for a subsequent system startup, based upon the peak temperature reached following the heat cutoff during the proceeding system startup. Furthermore, prior art systems fail to provide a controller which adjusts the threshold temperature based upon the rate of rise of the cooking medium temperature during the post-melt mode.

The idle mode of prior art systems also has several drawbacks. In this regard, different system and operating conditions may require more or fewer pulses of heat, consequently frequent control of the heating element may be required to maintain the operator selected setpoint temperature during the idle mode. The very nature of the prior art approach to the idle mode results in many operations of heating element components, thus reducing the life of these components. In many cases, tight control of the cooking medium temperature is not as beneficial to the cooking process as is the extension of the life of the components comprising the heating element. The prior art fails to provide a controller that allows the operator to select an acceptable band for the peak-to-valley temperature excursion, so as to maximize the life of heating element components.

There are disadvantages to the cook mode of prior art systems as well. In this respect, prior art cook modes fail to compensate for the build-up of stored energy, which occurs when successive cooking operations are initiated. Accordingly, at the end of a series of "full load" cooks the cooking medium temperature can overshoot the operator selected setpoint temperature by an unacceptable amount due to the build-up of stored energy in the system. In addition, each cook in a series of cooks will have a different "bottom temperature" as a result of heat build-up. Therefore, each cook in the series will not be uniform.

The prior art's manual procedure for entering the boil mode poses a safety hazard. In this respect, if the vat is filled with water and the controller believes the system is preparing to cook (i.e., begins a start-up cycle), too much heat will be applied to the water, and a boil-over condition could occur. In this respect, damage to the cooking appliance could occur and anyone in close proximity could be injured.

A second aspect of the present invention relates to time compensation, during the cook mode. Time compensation is necessary for convenient operation of the fryer, since the time for the temperature of a food product itself to reach a predetermined "fully cooked" temperature will vary based upon the quantity of food product in the vat and the temperature of the cooking medium during the cook mode. In this respect, it would be advantageous to provide time compensation so that an operator can enter the same cook time each time the same type of food product is being cooked, without concern for the quantity (i.e., load size) of food product introduced into the vat and variations in cooking medium temperature during a cook mode operation.

The present invention addresses the foregoing and other problems, and is directed to an electronic control system and more specifically to an electronic control system having a programmable microcontroller and associated peripherals, for use with heating apparatus, such as fryers, ovens, pressure cookers, pasta cookers, holding cabinets, furnaces, and water heaters.

SUMMARY OF THE INVENTION

According to the present invention there is provided a temperature control system for a heating apparatus having input means for inputting a setpoint temperature, means for heating a medium, means for sensing the temperature of the medium, and control means for controlling the amount of heat provided to the medium by the means for heating, wherein during an idle mode of operation the control means causes said means for heating to generate a pulse of heat each time the temperature of the medium changes from a temperature above an idle-ON temperature to a temperature below the idle-ON temperature.

According to another aspect of the present invention there is provided a method of operating a control system to classify a medium in a cooking chamber as air or non-air comprising the steps of determining a first measured temperature of the medium, storing the first measured temperature of the medium, activating a heating element to heat said medium for a first predetermined period of time, deactivating said heating element for a second predetermined period of time, determining a second measured temperature of the medium, comparing the first measured temperature of the medium to said second measured temperature, and classifying said medium as air if said second measured temperature does not exceed said first measured temperature by a predetermined amount.

According to another aspect of the present invention there is provided a temperature control system for a cooking apparatus comprising input means for inputting a setpoint temperature; means for heating a cooking medium; means for sensing the temperature of the cooking medium; control means for controlling the amount of heat provided to the cooking medium by said means for heating, wherein during a melt operation the control means causes said means for heating to generate pulses of heat of uniform duration and duty cycle until a predetermined melt release temperature is reached, and thereupon causing said means for heating to provide continuous heat until a predetermined cutoff temperature is reached, said control means comprising: means for adjusting said predetermined cutoff temperature, during subsequent melt operations wherein the predetermined cutoff temperature is adjusted in accordance with the difference between the setpoint temperature and the peak temperature obtained after the predetermined cutoff temperature has been reached.

According to another aspect of the present invention there is provided a temperature control system for a cooking apparatus comprising means for heating a cooking medium; means for sensing the temperature of the cooking medium; means for inputting a cooking medium parameter; and control means for controlling the means for heating, wherein during a melt mode a duty cycle for pulsing the means for heating is determined in accordance with said cooking medium parameter.

According to another aspect of the present invention there is provided a temperature control system for a cooking apparatus comprising means for heating a cooking medium; means for sensing the temperature of the cooking medium; means for initiating a post-melt mode; means for detecting whether the temperature of the cooking medium has stopped rising at a temperature between approximately 200° F. and 220° F., means for switching to a boil mode if said means for detecting has detected that the temperature of the cooking medium has stopped rising at a temperature between approximately 200° F. and 220° F.

According to another aspect of the present invention there is provided a temperature control system for a cooking apparatus comprising means for heating a cooking medium; means for sensing the temperature of the cooking medium; and control means for controlling the amount of heat provided to the cooking medium by the means for heating, wherein during a cook mode said control means dissipates excess heat.

According to another aspect of the present invention there is provided a temperature control system :for a cooking apparatus comprising input means for inputting a desired setpoint temperature; heating means for heating a cooking medium; temperature sensing means for determining the temperature of the cooking medium; control means for controlling the amount of heat provided by the heating means to the cooking medium, wherein: during a melt mode the heating means providing pulses of heat to the cooking medium, said pulses having uniform duration and duty cycle; during a post-melt mode the heating means providing continuous heat to the cooking medium until a cutoff temperature is reached, thereafter the heating means providing no heat to the cooking medium; said cutoff temperature being modifiable, for subsequent start-ups, in accordance with the difference between the peak temperature obtained after the cutoff temperature is reached and the setpoint temperature, during an idle mode the temperature control means causing the means for heating to generate a single pulse of heat each time the temperature of the cooking medium drops below a predetermined temperature.

According to another aspect of the present invention there is provided a temperature control system for a heating apparatus comprising a keypad for inputting a setpoint temperature; a heating element for heating a medium; temperature sensor for sensing the temperature of the medium; and a control unit for controlling the amount of heat provided to the medium by the heating element, wherein during an idle mode of operation the control unit causes the heating element to generate a pulse of heat each time the temperature of the medium changes from a temperature above an idle-ON temperature to a temperature below the idle-ON temperature.

According to another aspect of the present invention there is provided a temperature control system for maintaining a medium at a setpoint temperature comprising means for heating a medium; means for sensing the temperature of the medium; temperature control means for controlling the amount of heat provided to the cooking medium by the means for heating, wherein said temperature control means comprises means for generating a pulse of heat each time the temperature of the medium changes from a temperature above a predetermined pulse temperature to a temperature below the predetermined pulse temperature; means for adjusting the duration of said pulse of heat based upon the difference between peak temperature resulting from a previous pulse of heat and a valley temperature resulting from said previous pulse of heat.

According to another aspect of the present invention there is provided a temperature control system for a cooking apparatus comprising input means for inputting a setpoint temperature; means for heating a cooking medium; means for sensing the temperature of the cooking medium; temperature control means for controlling the amount of heat provided to the cooking medium by the means for heating, wherein said temperature control means comprises: means for operating in an idle mode when no cooking is taking place; means for operating in a cook mode when a cook mode is initiated; and means for dissipating excess heat in the cooking medium during the cook mode prior to the cooking medium reaching the setpoint temperature.

According to another aspect of the present invention there is provided a method of heating a cooking medium comprising generating uniform pulses of heat to the cooking medium, until the cooking medium has reached a first predetermined temperature; continuously heating the cooking medium after the first predetermined temperature is reached and until a cutoff temperature is reached; stop adding heat to the cooking medium after the cutoff temperature is reached and until the cooking medium temperature changes from a temperature above an idle-ON temperature to a temperature below the idle-ON temperature; generating a first pulse of heat of predetermined duration, and subsequent pulses of heat of a duration dependent upon the peak-to-valley temperature difference resulting from a preceding pulse of heat; and continuously heating the cooking medium if the temperature of the cooking medium drops below a predetermined minimum temperature.

According to another aspect of the present invention there is provided a timer controller comprising means for storing time compensation values for corresponding temperatures; means for inputting a setpoint temperature; means for determining an offset value in accordance with said setpoint temperature; and means for determining an adjusted time compensation value for a measured temperature based upon the time compensation value corresponding to the measured temperature and the offset value.

According to still another aspect of the present invention there is provided a method for adjusting a cooking time comprising time compensation values for corresponding temperatures; inputting a setpoint temperature; determining an offset value in accordance with said setpoint temperature; and determining an adjusted time compensation value for a measured temperature based upon the offset value and the time compensation value for the measured temperature.

It is an object of the present invention to provide an electronic control system for a heating apparatus.

It is an object of the present invention to provide an electronic control system as described above which controls temperature and provides time compensation.

It is another object of the present invention to provide an electronic control system as described above which provides accurate temperature control with minimized wear of heating element components.

It is another object of the present invention to provide an electronic control system as described above which minimizes the number of times the heating element is pulsed during an idle mode and consequently minimizes wear on heating element components.

It is another object of the present invention to provide an electronic control system as described above which detects whether the cooking chamber is empty or filled with liquid or solid shortening.

It is another object of the present invention to provide an electronic control system as described above which, depending upon the type of cooking medium, uses a different duty cycle for pulsing the heating element during the melt mode.

It is still another object of the present invention to provide an electronic control system as described above, which can adjust the cutoff temperature of the post-melt mode so that the temperature of the cooking medium can be rapidly increased to the setpoint temperature, with controlled overshoot.

A still further object of the present invention is to provide an electronic control system as described above which dissipates excess stored energy in order to prevent unacceptable overshoot of the setpoint temperature during a cook mode and to provide uniform cooking temperatures.

It is another object of the present invention to provide an electronic control system as described above which recognizes when water is in the vat, and in response automatically enters a boil mode.

A still further object of the present invention is to provide an electronic control system which provides accurate time compensation during a cook mode.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein:

FIGS. 6A, 6B and 6C show a flow chart for a preferred embodiment of the idle mode.

DETAILED DESCRIPTION

Figure 1:
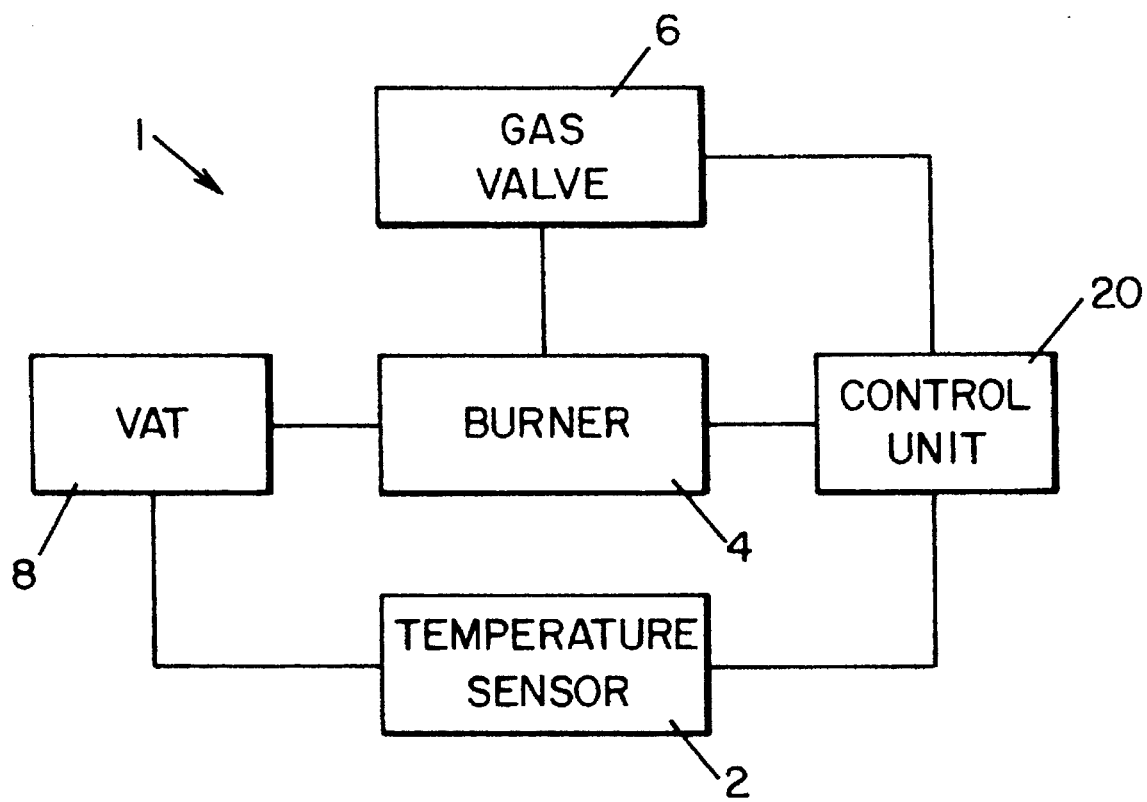
FIG. 1 is a block diagram of a deep fat fryer arrangement.

Referring now to the drawings wherein the showing is for the purpose of illustrating a preferred embodiment of the invention only, and not for the purpose of limiting same, FIG. 1 shows a block diagram of a deep fat fryer 1 comprising a temperature sensor 2, a gas burner 4, a gas valve 6, a vat 8 and a control unit 20. It should be appreciated that other types of heating elements can be used in place of the gas burner and gas valve, including an electric element.

Figure 2:
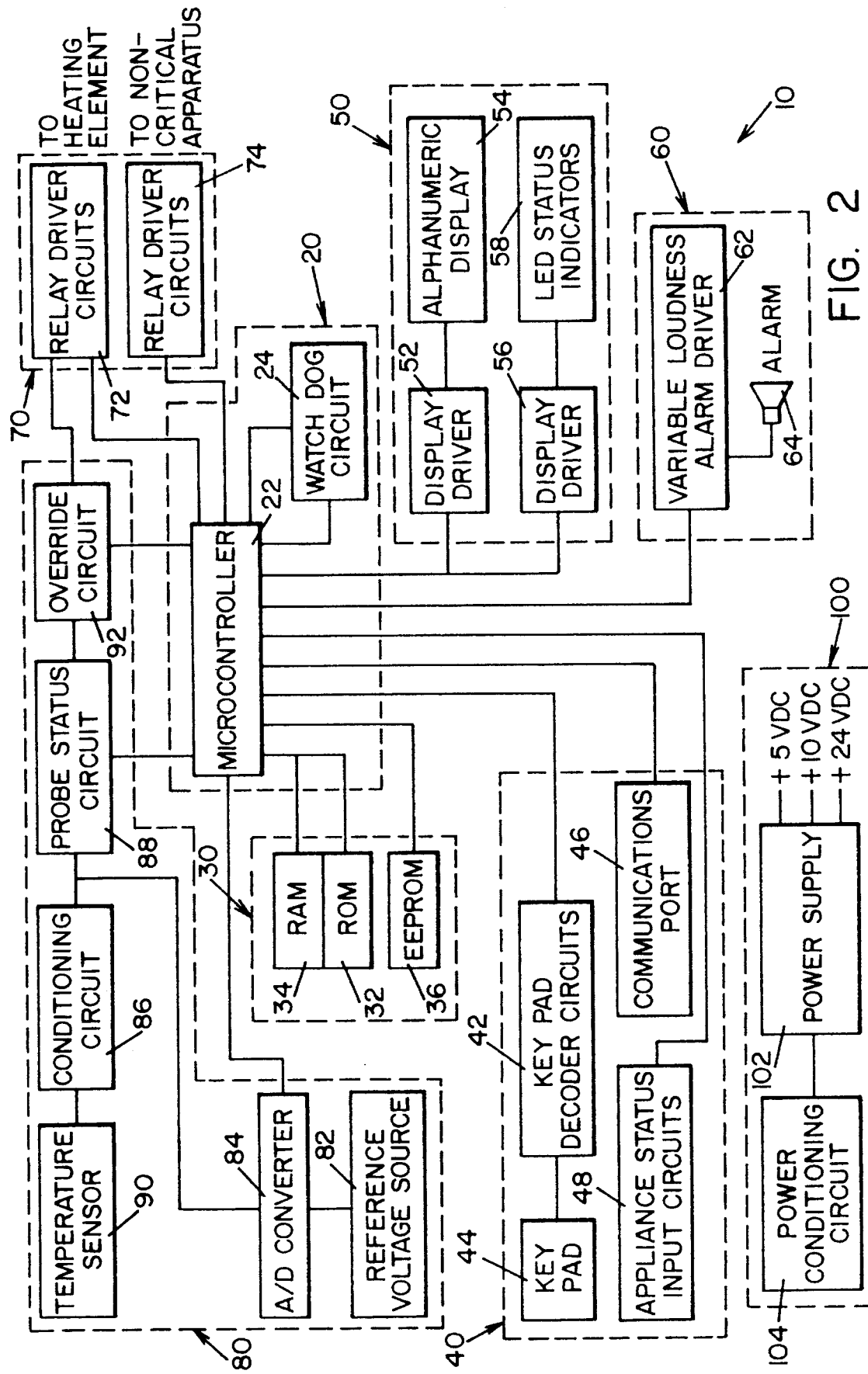
FIG. 2 is a block diagram of a fryer controller disclosing a preferred embodiment of the present invention.

FIG. 2 shows a block diagram of fryer controller 10 illustrating a preferred embodiment of the present invention. It should be appreciated that while the preferred embodiment of the present invention relates to a controller for a deep falt fryer, the present invention is also contemplated for use with other heating apparatus.

Fryer controller 10 is generally comprised of a control unit 20, a memory subsystem 30, an input subsystem 40, a display subsystem 50, an alarm subsystem 60, an output subsystem 70, a temperature sensing subsystem 80, and a power subsystem 100.

Control unit 20 is comprised of a microcontroller 22 and a watchdog circuit 24. Microcontroller 22 acts as the central "brain" of the fryer controller system. In this respect, it manages all temperature control and timing functions. Preferably, microcontroller 22 is an 80C32 microcontroller manufactured by Intel Corporation. Watchdog circuit 24 is a monitoring circuit which assures, as much as possible, that microcontroller 22 is functioning properly. In this respect, watchdog circuit 24 is reset by microcontroller 22 every 1/10 of a second. If watchdog circuit 24 fails to receive a reset signal from microcontroller 22, the watchdog timer will reset microcontroller 22. It will also be appreciated that control unit 20 can also be configured without watchdog circuit 24.

Memory subsystem 30 is comprised of a ROM 32, a RAM 34 and an EEPROM 36. ROM 32 provides program instructions to microcontroller 22. RAM 34 stores temporary data such as current temperature, time left to cook, etc., while EEPROM 36 stores changeable setup data provided by the operator or manufacturer. However, unlike RAM 34, EEPROM 36 retains information even when the fryer controller is turned off.

Input subsystem 40 is comprised of keypad decoder circuits 42, a keypad 44, a communications port 46 and appliance status input circuits 48. Keypad decoder circuits 42 decode signals generated by keypad 44 and transmit the decoded signals to microcontroller 22. Keypad decoder circuits 42 reduce the number of input lines required by microcontroller 22 to receive data from keypad 44. In addition, decoder circuits 42 also provide electrostatic discharge (ESD) protection. Keypad 44 is preferably a four-by-four type keypad matrix, which is used by the operator to input data to microcontroller 22.

Communications port 46 is used to program microcontroller 22 with programmable features such as times and temperature. This data is typically stored in EEPROM 36.

Appliance status input circuits 48 receive status signals from external valves and switches (e.g., a drain valve interlock, door interlocks, an ON/OFF switch, and a gas pressure switch), and feeds the signals to microcontroller 22, preferably via optocoupled inputs.

Display subsystem 50 is comprised of display drivers 52 and 56, an alphanumeric display 54, and LED status indicators 58. Display driver 52 and display driver 56 drive alphanumeric display 54 and LED status indicators 58, respectively, by conditioning low level outputs from microcontroller 22. Alphanumeric display 54 is preferably an 8 or 16 character, 14 ; segment LED display, which communicates messages to the operator from microcontroller 22. LED status indicators 58 are single LEDs which indicate the status of a system component and inform the operator whether a particular function has been invoked.

Alarm subsystem 60 is comprised of a variable loudness alarm driver 62 and an alarm 64. Variable loudness alarm driver 62 is provided to drive alarm 64 by decoding output from microcontroller 22 to change the volume of alarm 64. Alarm 64 is used by microcontroller 22 to alert the operator of the existence of a particular condition. Preferably, alarm 64 is comprised of a piezoelectric buzzer.

Output subsystem 70 is comprised of relay driver circuits 72 and relay driver circuits 74. Relay driver circuits 72 drive relays which turn the heating element on and off. Relay driver circuits 74 drive relays which control non-critical apparatus of the fryer, such as automated basket lifts.

Temperature sensing subsystem 80 is comprised of a reference voltage source 82, an analog-to-digital (A/D) converter 84, a conditioning circuit 86, a probe status circuit 88, a temperature sensor 90 and an override circuit 92. Reference voltage source 82 provides a 3.2 volt steady voltage for calibrating analog circuits. In this respect, A/D converter 84 converts the analog voltage of reference voltage source 82 to a digital value usable by microcontroller 22. This digital value provides a reference value for calibrating temperature sensor 90. Temperature sensor 90 provides temperature readings inside the vat. The signal provided by temperature sensor 90 is conditioned by conditioning circuit 86 and fed to microcontroller 22 through A/D converter 84. Conditioning circuit 86 provides excitation for temperature sensor 90, and provides linearization and amplification of the output signal of temperature sensor 90. Probe status circuit 88 also receives the conditioned signal from conditioning circuit 86 and determines whether temperature sensor 90 has failed (e.g., an open probe circuit, or a shorted probe circuit). If probe status circuit 88 determines that temperature sensor 90 has failed, then override circuit 92 will send a signal to relay driver circuits 72 to turn off the heating element. Likewise, if an excessively high temperature is sensed by temperature sensor 90, override circuit 92 will send a signal to relay driver circuits 72 to turn off the heating element. Accordingly, override circuit 92 operates independently of microcontroller 22 to prevent hazardous conditions.

Power subsystem 100 provides the power required by the components of the fryer controller and is comprised of a power supply 102 and a power conditioning circuit 104. Power supply 102 supplies power to the electrical components of the fryer controller, while power conditioning circuit 104 prevents electrostatic discharge, lightning and other destructive energy from reaching the electrical components.

According to the present invention, the fryer controller provides six different modes of operation with respect to temperature control. It should be noted that the names given to each mode have been selected solely for the purpose of illustration, and are not intended to limit the scope of the invention.

The first mode shall be referred to as the "pre-melt mode." In the pre-melt mode the controller determines whether the cooking chamber (i.e., vat) is empty (i.e., filled with air) or filled with liquid or solid shortening.

The second mode of operation will be referred to as the "melt mode" during which the liquid or solid shortening, which are presumably in the cooking chamber, will be heated at an appropriate rate.

The next mode of operation will be referred to as the "post-melt mode." During this mode, the temperature of the cooking medium is allowed to rise quickly towards the operator selected setpoint temperature. Furthermore, during this mode it is determined whether the cooking chamber contains water rather than shortening. If it is determined that the cooking chamber is filled with water, the boil mode is automatically entered.

The pre-melt mode, melt mode, and post-melt mode, together comprise a "start-up cycle." The mode of operation directly following the start-up cycle will be referred to as the "idle mode." During this mode of operation, the temperature of the cooking medium is stabilized around the setpoint temperature. The controller will operate in this mode of operation until a cooking operation is initiated by the operator, by pressing a function key on keypad 44. At this time, the controller will enter a mode which will be referred to as a "cook mode." During the cook mode food product introduced into the cooking medium is cooked.

An additional operating mode, which will be referred to as the "boil mode," is used for a cleaning operation, as discussed above.

Pre-melt Mode

The pre-melt mode will begin once the fryer is powered up. The controller will use a default setting stored in memory to determine the type of melt operation to perform. The type of melt operations consist of a "liquid melt" operation, a "solid melt" operation, or a "no melt" operation. A liquid melt operation signifies that the medium in the cooking chamber is liquid shortening, while a solid melt operation signifies that the medium in the cooking chamber is solid shortening. A "no melt" operation signifies that the medium in the cooking chamber does not require a melt mode and consequently that the melt mode should be skipped. Therefore, if the "no melt" operation is indicated the controller will go from the pre-melt mode to the post-melt mode, provided that a hazardous condition has not been detected during the pre-melt mode. The default setting for the melt operation is changeable by the operator after the fryer has been powered up.

During the pre-melt mode the controller will determine whether the cooking chamber is empty or whether it contains liquid or solid shortening.

To determine whether the cooking chamber is empty or filled with liquid shortening, the current temperature of the medium in the cooking chamber is determined and stored in memory. The controller then turns on the heating element for a first predetermined period of time (e.g., a pulse of heat having a duration of approximately 20–40 seconds). The controller then turns off the heating element for a second predetermined period of time (e.g., 30–60 seconds). After the second predetermined period of time has elapsed, the controller once again determines the current temperature of the medium in the cooking chamber. This current temperature is compared to the previously stored temperature. If the current temperature exceeds the stored temperature by a predetermined amount (e.g., 15° F.), then the controller determines that the cooking chamber is empty (i.e., filled with air). Likewise, if the present temperature does not exceed the stored temperature by the predetermined amount, then the controller determines that the cooking chamber contains liquid shortening. During the post-melt mode (described in detail below), the controller will determine whether a medium detected as liquid shortening is actually water.

Once the controller has detected that the cooking chamber is empty it can take corrective action, such as displaying "VAT EMPTY" on alphanumeric display 54, sounding alarm 64, and/or locking up microcontroller 22, such that power to microcontroller 22 must be terminated and then restored before it is again operational.

In determining whether the cooking chamber contains solid shortening, it is noted that solid shortening will respond to heat by rising in temperature more quickly than liquid shortening. When heat is discontinued, the temperature of solid shortening will drop quickly in temperature, whereas air will drop in temperature more slowly. Accordingly, based upon the foregoing thermal characteristics, in a manner similar to detecting liquid shortening, the controller can detect whether the medium in the cooking chamber is solid shortening.

In an alternative approach to determining whether the cooking chamber is empty or filled with liquid or solid shortening, the controller will turn on the heating element for a predetermined period of time, long enough to cause a rise in the temperature of the medium in the cooking chamber by a preprogrammed amount. The time for the temperature to rise the preprogrammed amount will be measured. The controller will then enter a programmed OFF period, during which period it will measure the time that transpires as the temperature of the medium in the cooking chamber falls by a preprogrammed amount. The total time for the temperature of the cooking chamber contents to rise and fall will differ depending on the properties of the medium. In this respect, due to the added factor of the latent heat of fusion, solid shortening will have a different rise-fall time than that of liquid shortening. Likewise, an empty cooking chamber will also be discernably different due to the absence of any matter other than air. Accordingly, this alternative procedure allows the controller to identify whether the cooking chamber is empty or filled with liquid or solid shortening prior to entering the melt mode.

If the controller, using the approaches discussed above, determines that the medium in the cooking chamber is a different type than the type signified, the controller can take any of several actions. Among these, the controller can alert the operator that there is a discrepancy and require some action from the operator, or the controller can take independent action, such as shutting down or changing to the appropriate type of melt operation.

Melt Mode

During the melt mode, the controller causes the heating element of the fryer to generate pulses of heat of uniform duration and duty cycle, until the cooking medium reaches a predetermined temperature (i.e., the "melt release temperature"). The melt release temperature is typically 150° F.–180° F.

If a solid melt operation has been specified, the heating during the melt mode will be very gradual. For example, the pulse of heat may be ON for eight seconds with a period of 30 seconds. If a liquid melt operation has been specified, the heating of the cooking medium will be less gradual. For example, the heat pulse may have a duration of 16 seconds with a period of 30 seconds. Accordingly, different duty cycles can be used for different types of cooking mediums. If a "no melt" operation has been specified, then the entire melt mode will be skipped, and the controller will go from the pre-melt mode to the post-melt mode. In this case, the cooking medium will be heated very rapidly.

Once the cooking medium has reached the melt release temperature, the melt mode ends, since the cooking medium will now be an effective heat sink, which protects against isolated hot spots in the fryer and also prevents the cooking medium itself from overheating. Accordingly, during the melt mode, the temperature of the cooking medium gradually rises.

Post-Melt Mode

As discussed above, once the cooking medium has reached the melt release temperature, the controller begins operating in a post-melt mode. During the first portion of the post-melt mode, the heating element is continuously on (i.e., full ON). As a safety feature, the controller will monitor the temperature of the cooking medium and determine whether the temperature of the cooking medium has stopped rising at approximately 200° F.–220° F. (i.e., the temperature range that is associated with the boiling point of water over normal altitude variations). Accordingly, if the temperature of the cooking medium stops rising within this temperature range and remains stable for a predetermined period of time, the controller will intelligently ascertain that the medium in the cooking chamber comprises water rather than a cooking medium such as shortening. Therefore, the controller can provide safe operation of the equipment by automatically changing from the post-melt mode to a boil mode, which will be described in detail below. The controller does this without operator intervention and makes the change-over known to the operator by visual and/or audible means.

As stated above, the heating element is continuously on during the first portion of the post-melt cycle. This allows the temperature of the cooking medium to be quickly brought up close to the operator selected setpoint temperature. Once the controller determines that the temperature of the cooking medium has reached a pre-programmed threshold temperature (which is below the operator selected setpoint temperature), the heating element is turned off for the remainder of the post-melt mode. This pre-programmed threshold temperature is kept in the controller's non-volatile memory and represents a specific temperature offset from the operator selected setpoint temperature. When this threshold temperature is reached, the heating element is turned off, and the cooking medium temperature is allowed to coast toward the setpoint temperature. It should also be noted that the threshold temperature is alternatively referred to as the "cutoff temperature" since the heating element is "cutoff" at this temperature.

The threshold temperature may be adjusted following each start-up cycle. In this respect, when the temperature of the cooking medium stops increasing after the heating element has been turned off at the threshold temperature, the controller remembers the peak temperature reached after the turn off and calculates the deviation from the operator selected setpoint temperature. If the deviation is within a pre-programmed acceptable band about the setpoint temperature (e.g., the setpoint temperature +/–2° F.), the controller will not adjust the threshold temperature for the subsequent start-up cycle. However, if the deviation falls outside the pre-programmed acceptable band, the controller will adjust accordingly the threshold temperature for the subsequent start-up cycle. For example, the difference between the peak temperature and the setpoint temperature is added to or subtracted from a current threshold temperature to obtain an adjusted threshold temperature. This adjusted threshold temperature will be used during the subsequent start-up cycle.

The net effect of the foregoing action is to continuously adapt the threshold temperature based upon the results obtained during the preceding start-up cycle. Accordingly, the threshold temperature is adjusted for a subsequent start-up cycle, only if and when the peak temperature reached after the turn off during the previous start-up cycle falls outside the pre-programmed acceptable band about the setpoint temperature. In the event that this compensation is such that it begins to approach an unrealistic condition, the controller will alert the operator that the fryer is malfunctioning.

Alternatively, the threshold temperature can be shifted up or down by some amount proportional to the rate of rise of the cooking medium temperature. For example, if the controller has in its memory a value for the nominal rate of temperature rise and the actual measured value is less than this nominal value, then the controller can move the threshold temperature closer to the setpoint temperature by an amount proportional to the difference in the actual measured rate from that of the nominal. The opposite would occur in the case where the actual measured rate is greater than the nominal, although in practice the former is more often the case.

If the peak temperature reached, after the heating element is turned off, exceeds the setpoint temperature, the heating element will remain off until the temperature falls to the setpoint temperature. However, the idle mode, which is explained in detail below, will begin once the peak temperature has been reached.

If the peak temperature reached is below the setpoint temperature then a move-to-idle algorithm becomes operational. The move-to-idle algorithm provides a single pulse of heat which has a long enough duration (e.g., 40 seconds) to cause the temperature of the cooking medium to rise above the setpoint temperature. The heating element is then turned off and remains off until the temperature of the cooking medium falls to the setpoint temperature. As noted above, the idle mode begins once the peak temperature above the setpoint temperature is reached.

Idle Mode

During the idle mode, the controller causes the heating element to keep the temperature of the cooking medium within a range of temperatures (i.e., a control band defined by Tmin and Tmax) around the setpoint temperature. In a preferred embodiment of the present invention, the temperature control algorithm for the idle mode gives the operator the ability to program an acceptable temperature range about the setpoint temperature for the cooking medium temperature.

In an alternative embodiment of the present invention, the time interval between the start of any two pulses of heat may be programmed (e.g., by the operator), and thereby obtain whatever peak-to-valley excursions that will occur as a result thereof. The controller will automatically adapt to the physical system that it is controlling, forcing whatever temperature excursions that are necessary so as to achieve the correct interval between pulses of heat. In this respect, if the time interval between two pulses of heat exceeds the programmed time interval, then the duration of the pulse is decreased. If the time interval between two pulses of heat is less than the programmed time interval, then the duration of the pulse is increased.

Accordingly, the controller either measures the peak-to-valley excursion of the cooking medium temperature about the setpoint temperature and then makes a correction to the duration of the heat pulse, or the controller times the interval between the start of pulses of heat and then makes a correction to the duration of the heat pulse. In either case, the correction to the duration of the heat pulse is made only once per cycle each time the pulse occurs.

While initially the heating element will be pulsed when the cooking medium temperature crosses the setpoint temperature (i.e., crosses from a temperature above the setpoint temperature to a temperature below the setpoint temperature), once the peak-to-valley temperature swings are stabilized, the asymmetry about the setpoint temperature is evaluated. The temperature at which the heating element is pulsed is then adjusted (i.e., lowered or raised) in order to obtain peak-to-valley temperature excursions which are symmetrical about the operator selected setpoint temperature. The adjusted temperature is referred to as the "adjusted idle ON setpoint temperature." Accordingly, the heating element will be pulsed when the cooking medium temperature crosses the adjusted idle ON setpoint temperature (i.e, crosses from a temperature above the adjusted idle ON setpoint temperature to a temperature below the adjusted idle ON setpoint temperature).

If the temperature at which the heat pulse occurs is not adjusted for symmetry, there would be a tendency for the peak-to-valley temperature excursions to occur asymmetrically about the operator selected setpoint temperature, thus giving an appearance of operation at a temperature other than that selected by the operator.

Cook Mode

It has been observed that if the heating element is turned on and remains on during a cook mode for a long period of time, or if a series of cooks are initiated, one-after-another, that there is a residual heat build-up in the system. This residual heat build-up will often result in serious overshoots of the setpoint temperature. Not only is the recovery back to the setpoint temperature affected, but the thermal characteristics of each successive cook can also be altered, thus resulting in unacceptable changes in the quality of the cooked food product. In this respect, the bottom temperature reached after a load of food product is introduced into the cooking chamber will rise as successive cooks are initiated. Accordingly, the controller of the present invention will dissipate residual heat during the cook mode.

In general, during the cook mode, the heating element will be continuously on, as long as the temperature of the cooking medium remains below a predetermined temperature that is below the setpoint temperature (e.g., a temperature 10° F. below the setpoint temperature). This predetermined temperature is referred to as the "TURN-OFF temperature." However, as noted above, the controller will dissipate built-up heat in the system. In this respect, the controller will temporarily turn off the heating element sometime during the cook mode at a temperature below the TURN-OFF temperature. Accordingly, the heating element is temporarily turned off at some time following a rise in the cooking medium temperature, after the introduction of food product, but before reaching the TURN-OFF temperature. In a preferred embodiment of the invention the controller is turned off as soon as the cooking medium temperature begins to rise (following introduction of food product to the cooking chamber) and is turned back on as soon as the temperature of the cooking medium begins to fall. In an alternative embodiment of the present invention, the heating element is turned off when the cooking medium temperature has risen to a predetermined temperature that is below the TURN-OFF temperature and remains off until the cooking medium temperature falls by a predetermined amount. Temporarily turning the heat off for some period of time during the cook mode provides the heat dissipation necessary to prevent overshoot and provide uniform cooking.

Following the dissipation of heat, the heating element will continue to be on until the temperature of the cooking medium reaches the predetermined TURN-OFF temperature which is below the setpoint temperature. The TURN-OFF temperature is determined to allow the temperature of the cooking medium to coast above the setpoint temperature (and thus re-enter the idle mode) without risking serious overshoot of the setpoint temperature. It should be noted that even if a cook timer elapses, the heating element will remain on until the predetermined TURN-OFF temperature is reached. Once a peak temperature above the setpoint temperature is reached, the controller will re-enter the idle mode. If the cooking medium temperature is unable to coast above the setpoint temperature, the heating element will be pulsed for a duration sufficient for the cooking medium to exceed the setpoint temperature.

It will also be appreciated that the present invention can alternatively be configured without the heat dissipation feature of the cook mode.

The cook mode is initiated by the operator by selecting a "product key" on keypad 44 corresponding to a particular food product (e.g., frozen french fries). A cooking time is pre-stored in memory for each food product option.

An alternative embodiment of the present invention includes an "instant-on" feature. Once a product key is depressed to begin the cook mode, the controller immediately turns the heating element on, without regard to the temperature of the cooking medium. After a period of approximately 15 seconds, the controller will evaluate whether the temperature has gone up or fallen. If the temperature has gone up, the heating element is turned off, whereas if the temperature has fallen, the heating element will remain on (i.e., continuously ON).

It will also be appreciated that automated or manual basket lifts may be used to introduce food product into the cooking medium during the cook mode. In this respect, initiation of the cook mode by the operator can be used to signal the automated basket lifts to drop into the cooking medium.

Boil Mode

The boil mode is used to periodically clean the cooking chamber of the appliance. Cleaning is performed by filling the cooking chamber with water and detergents and then heating the solution to a predetermined boil mode temperature (e.g., approximately 195° F.). However, a hazardous boil-over condition can occur if a melt mode begins while water is in the cooking chamber. In this respect, after the melt release temperature has passed and continuous heat is applied, the temperature of the cooking chamber contents will exceed the boiling point of water. Accordingly, a boil-over condition can result in damage to the cooking appliance and possible injury to anyone in close proximity. Therefore, the controller of the present invention will automatically change from a melt mode to a boil mode when water is detected in the cooking chamber.

DETAILED OPERATION

Detailed operation of the controller will now be explained with reference to FIGS. 3–8.

Figure 3:
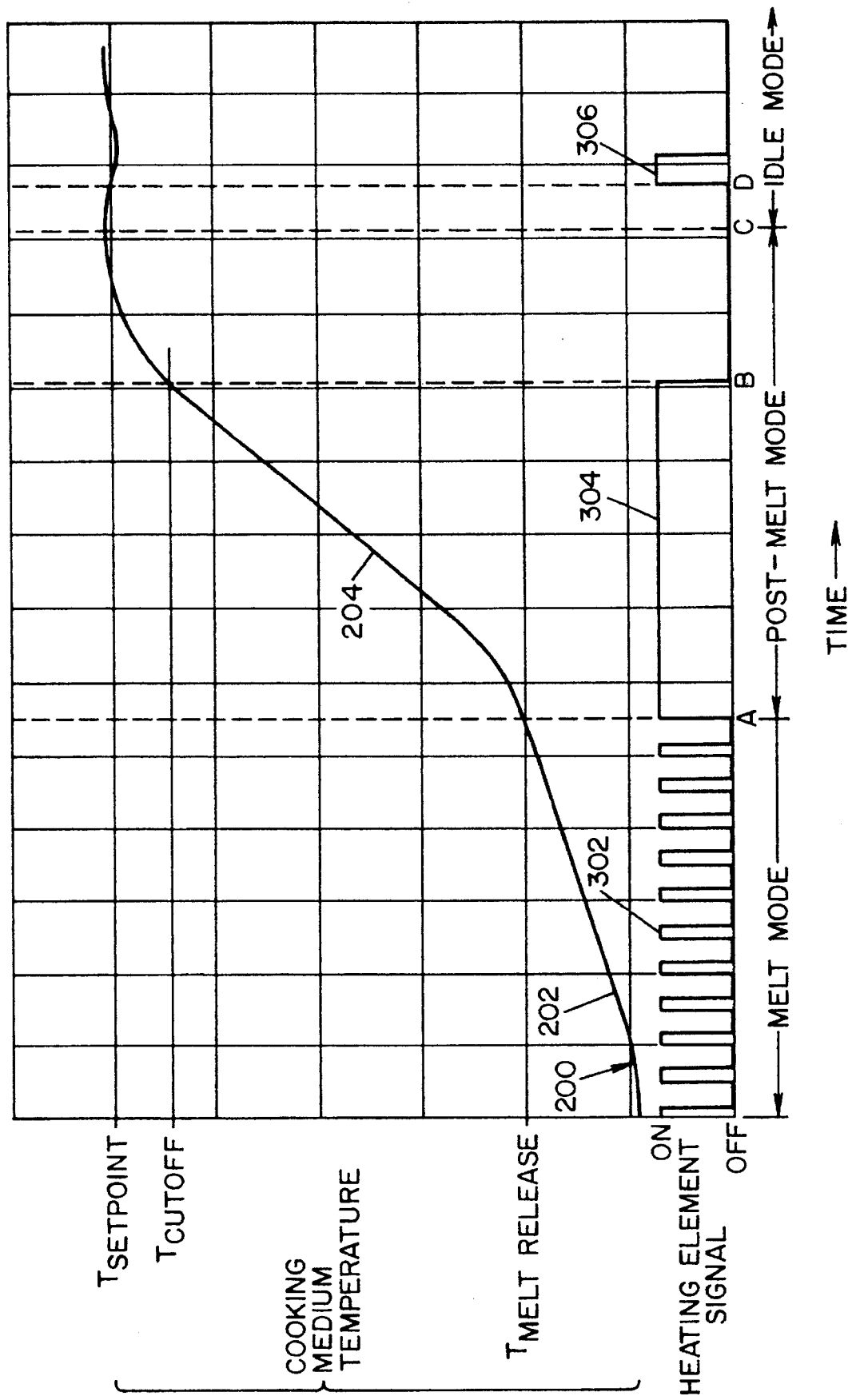
FIG. 3 is a time/temperature graph illustrating a melt-mode, post-melt mode and subsequent idle mode.

With reference to FIG. 3, there is shown a time/temperature graph of a typical melt mode, post-melt mode and idle mode. During the melt mode, the heating element is pulsed at a constant rate, as shown at portion 302 of the heating element signal. Accordingly, the temperature of the cooking medium will gradually rise, as shown at portion 202 of the cooking medium temperature line 200. Once the temperature of the cooking medium reaches the melt release temperature of approximately 150° F.–180° F., the post-melt mode begins (see time reference A), and the heating element operates continuously on (i.e., full ON) until a modifiable cutoff temperature is reached. Accordingly, the heating element remains unconditionally ON until the modifiable cutoff temperature is reached, as indicated at portion 304 of the heating element signal. This allows the temperature of the cooking medium to quickly rise to a temperature close to the setpoint temperature selected by the operator. This is shown by portion 204 of cooking medium temperature line 200. The cutoff temperature is generally 25°–35° F. below the operator's selected setpoint temperature. When the temperature of the cooking medium reaches the cutoff temperature, the heating element is turned OFF, as shown at time reference B. With the heating element turned OFF, the temperature of the cooking medium will continue to rise (due to residual heat) until it reaches a peak temperature near the setpoint temperature. The idle mode begins when the peak temperature is reached, as shown at time reference C.

Referring now to the idle mode, the heating element remains OFF, and the cooking medium temperature is allowed to coast downward until reaching the setpoint temperature. Once the cooking medium temperature changes from a temperature above the setpoint temperature to a temperature below the setpoint temperature, the heating element is pulsed (i.e., turned ON for a predetermined period of time, as shown at time reference D). Portion 306 of the heating element signal illustrates a first pulse of heat during the idle mode. This initial pulse is of predetermined duration. A control band is established above and below the setpoint temperature from, for example, 2° F. below the setpoint temperature to 2° F. above the setpoint temperature. These temperatures are referred to as Tmin and Tmax respectively. At temperatures above Tmax, the heating element is unconditionally OFF, whereas at temperatures below Tmin, the heating element is unconditionally ON. As the temperature of the cooking medium changes from a temperature above the setpoint temperature to a temperature below the setpoint temperature, the heating element is again pulsed.

As noted above, the first pulse generated during the idle mode will be of a predetermined duration. The duration of subsequent heat pulses will be varied based upon the peak-to-valley temperature difference resulting from the previous heat pulse. If the peak-to-valley temperature swing (i.e., difference) exceeds a threshold value, for example, 4° F., then the duration of the pulse is decremented. In other words, the controller monitors the highest temperature (i.e., peak) obtained as a result of a heat pulse against the lowest temperature (i.e., valley) reached before a subsequent heat pulse causes the temperature of the cooking medium to rise. Thus, the duration of each successive pulse is based upon the peak-to-valley temperature swing generated by the previous pulse. If the peak-to-valley temperature swing is less than what is desired, then the duration of the heat pulse is incremented.

Once the peak-to-valley temperature swings are stabilized, the asymmetry about the setpoint temperature is evaluated, and the temperature at which the heating element is pulsed is lowered or raised in order to obtain a peak-to-valley temperature swing approximately symmetrical about the setpoint temperature. Accordingly, the cooking medium temperature waveform is essentially shifted by adjusting the temperature at which the heating element is pulsed. As noted above, the adjusted temperature is referred to as the "adjusted idle ON setpoint temperature."

Figure 4:
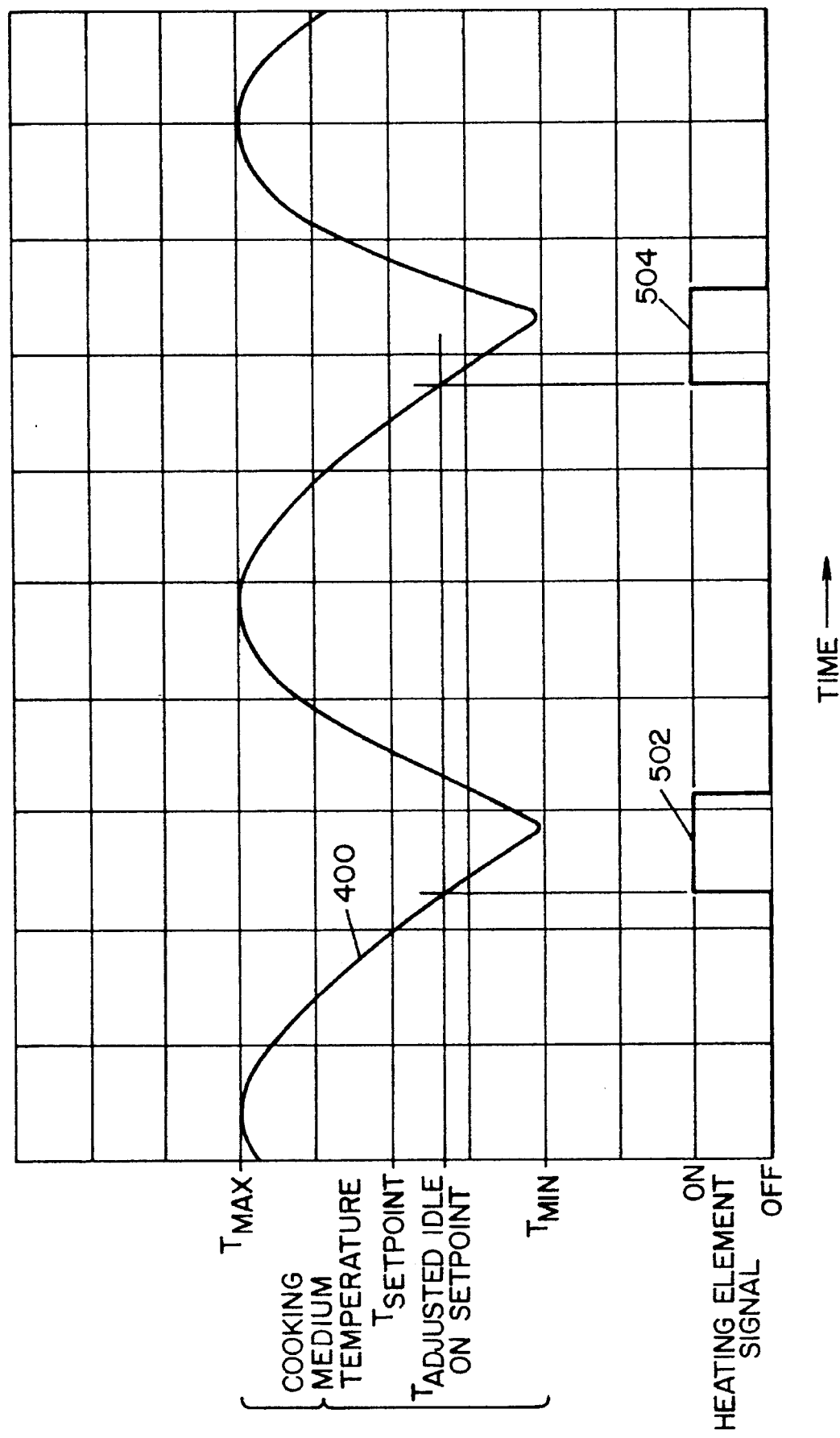
FIG. 4 is a time/temperature graph illustration of an idle mode in which the cooking medium temperature varies symmetrically about a setpoint temperature.

Referring now to FIG. 4, there is shown a time/temperature graph illustrating an idle mode having a symmetrical temperature swing about the operator selected setpoint temperature. A heat pulse 502 occurs as the temperature of the cooking medium (see cooking medium temperature line 400) moves from a temperature above the adjusted idle ON setpoint temperature to a temperature below the adjusted idle ON setpoint temperature. In the example shown in FIG. 4, the adjusted idle ON setpoint temperature is below the operator selected setpoint temperature in order to provide a symmetrical temperature swing about the operator selected setpoint temperature. Another heat pulse 504 occurs as the temperature of the cooking medium again changes from a temperature above the adjusted idle ON setpoint temperature to a temperature below the adjusted idle ON setpoint temperature. The system will remain in this symmetrical state until a cooking operation is initiated by the operator, and the cook mode is entered.

Figure 5:
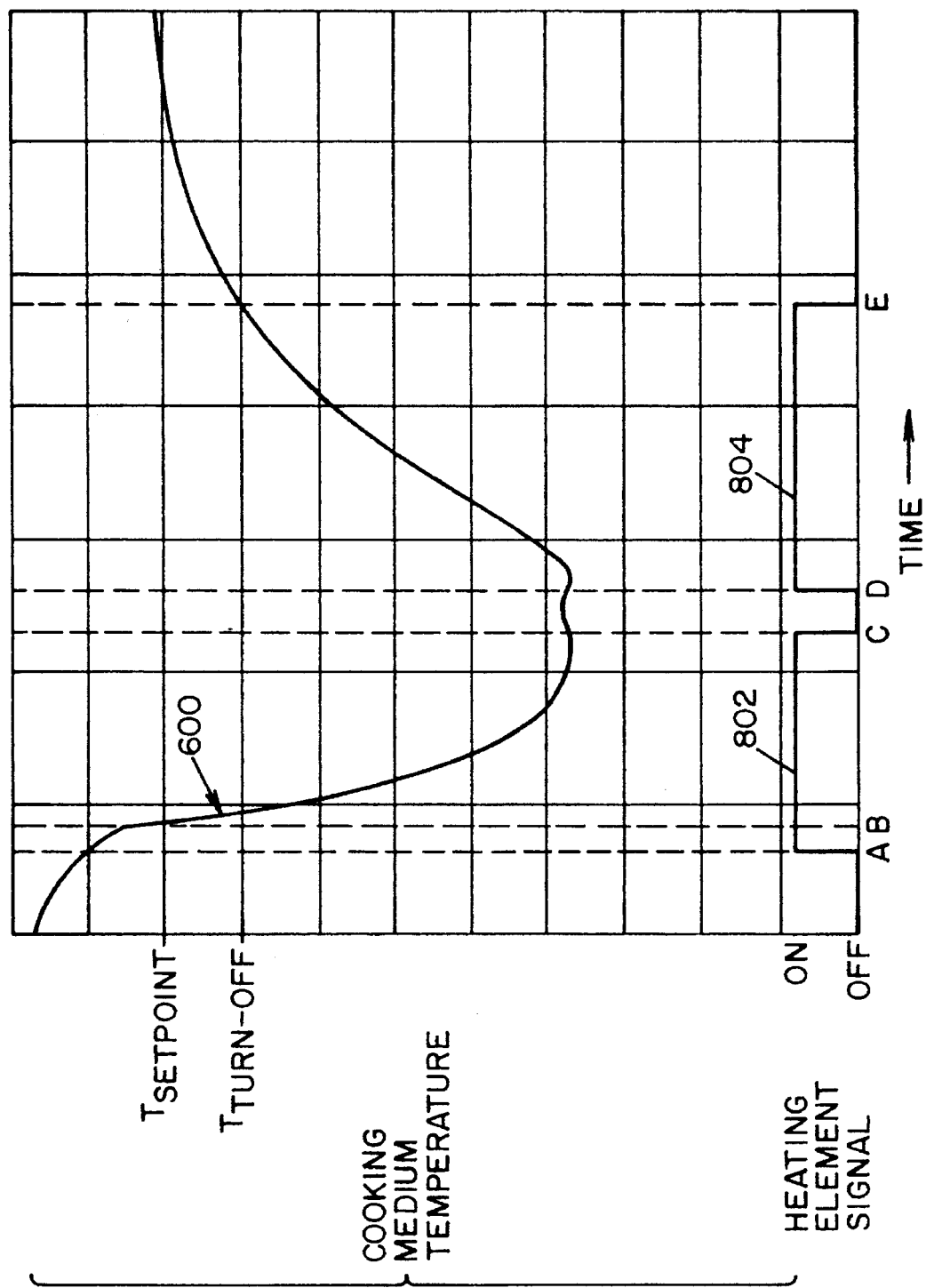
FIG. 5 is a time/temperature graph illustrating a cook mode.

Referring now to FIG. 5, a time/temperature graph of a cook mode is shown. The controller operates in the idle mode until a cook mode is initiated by the operator. A cook mode is initiated by the operator at time reference A, which causes the controller to turn the heating element on, as indicated at portion 802 of the heating element signal. In response to the introduction of food product, cooking medium temperature line 600 plunges quickly beginning at time reference B. As temperature line 600 recovers and begins to rise, the heating element is turned off (as shown at time reference C). Accordingly, excess heat is dissipated. Once the cooking medium begins to drop, the heating element is turned on (as shown at time reference D) and will remain on until the TURN-OFF temperature is reached at time reference E. This is shown by portion 804 of the heating element signal. Once a peak temperature above the setpoint temperature is reached, the controller will re-enter the idle mode.

The controller system of the present invention also includes a boil mode during which the controller sustains the temperature at a predetermined boil mode temperature (e.g., approximately 195° F.). As discussed above, the present invention includes a safety feature in the event that water is in the cooking chamber, and a start-up cycle has been initiated. In this respect, during the post-melt mode, the controller monitors the temperature of the cooking medium in the cooking chamber and determines whether the temperature has stopped rising at approximately 200°–220° F. (i.e., the temperature range that is associated with the boiling point of water over normal altitude variations). If the temperature has stopped rising, then it is determined that water is in the cooking chamber rather than shortening. Accordingly, the system will automatically transfer from the post-melt mode to the boil mode and drop and control the operating temperature to the predetermined boil mode temperature. This feature prevents the possibility of violent boiling of water during an intended cleaning procedure.

Figure 6A:
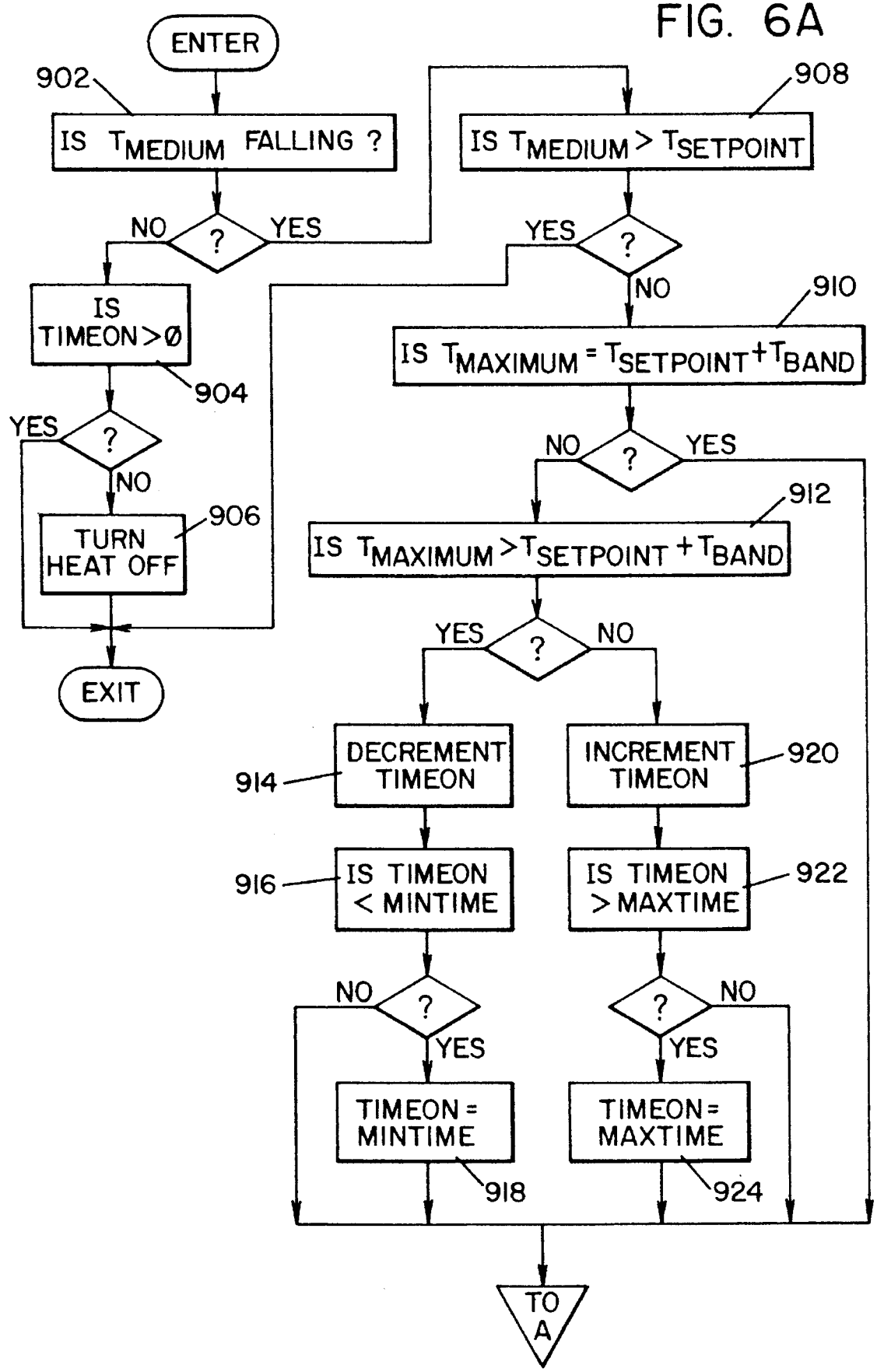
Figure 6B:
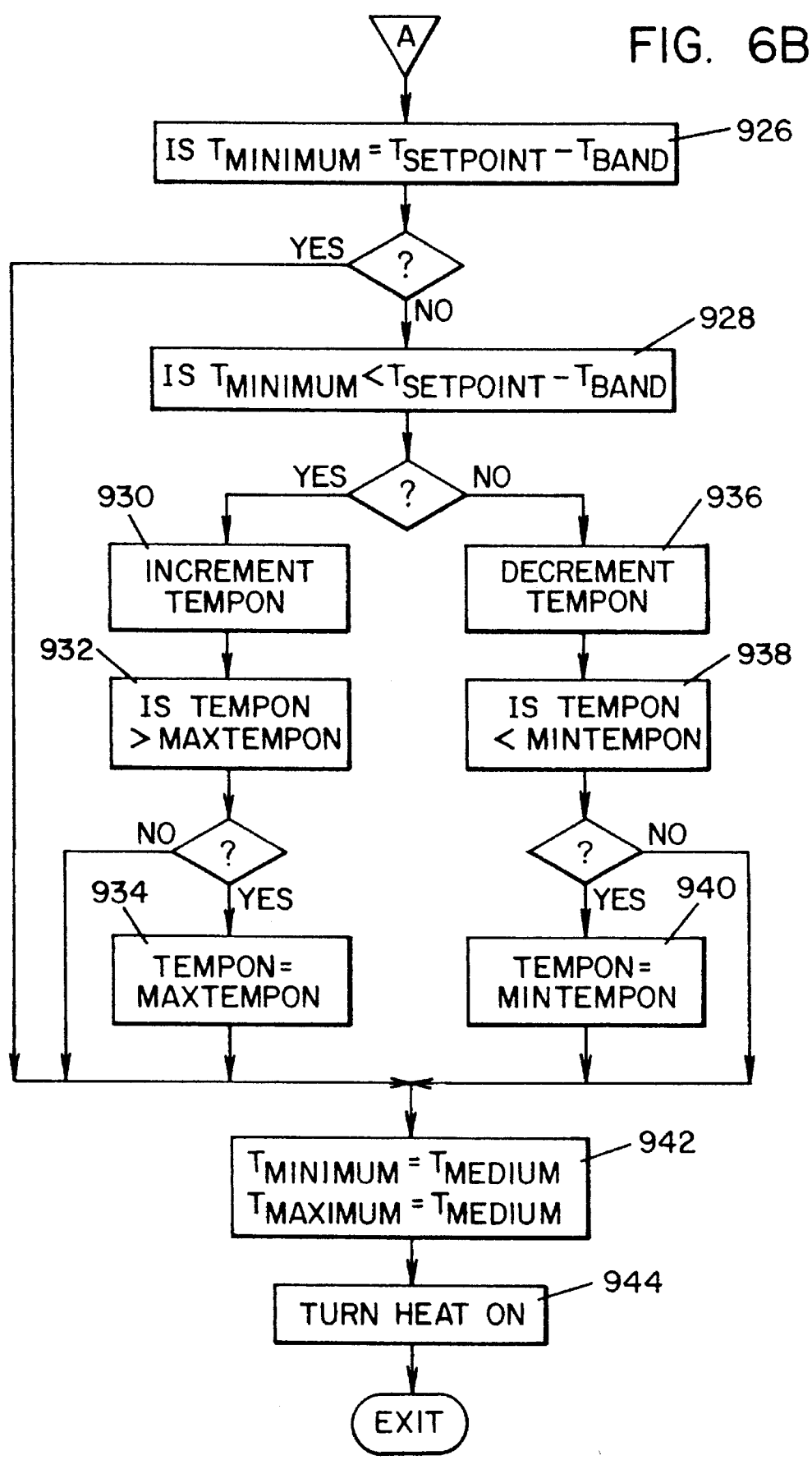

Referring now to FIGS. 6A, 6B and 6C, there is shown a flow chart for a preferred embodiment of the idle mode. Table 1 set forth below defines the terms used in the flow charts shown in FIGS. 6A, 6B, 6C and 7:

TABLE 1

| Term | Definition |
| --- | --- |
| $T_{MEDIUM}$ | Temperature of the cooking medium |
| $T_{SETPOINT}$ | Setpoint temperature |
| $T_{BAND}$ | One half the temperature control band |
| $T_{MAXIMUM}$ | Maximum cooking medium temperature reached during a cycle of the idle mode |
| $T_{MINIMUM}$ | Minimum cooking medium temperature reached during a cycle of the idle mode |
| TIMEON | Time duration of a pulse of heat |
| MINTIME | Minimum time duration for the pulse of heat |
| MAXTIME | Maximum time duration for the pulse of heat |
| TEMPON | Temperature at which the pulse of heat is initiated |

TABLE 1-continued

| Term | Definition |
| --- | --- |
| MAXTEMPON | Maximum temperature at which the pulse of heat is initiated |
| MINTEMPON | Minimum temperature at which the pulse of heat is initiated |

With reference to FIG. 6A, the idle mode begins by determining whether the temperature of the cooking medium is falling (Step 902). If not, it determines whether the duration of the pulse has elapsed (Step 904). If the duration of the pulse has elapsed, the heat is turned off (Step 906) and another cycle of the idle mode algorithm is begun.

If the temperature of the cooking medium is falling, it is determined whether the temperature has crossed the setpoint temperature (Step 908). If so, then it is determined whether the maximum temperature reached is equal to the maximum temperature for the selected control band (Step 910). If this is the case, then the pulse duration is correct for the selected control band and the algorithm continues to FIG. 6B which is discussed below. If the maximum temperature reached is not equal to the maximum temperature for the selected control band, then the duration of the pulse is either decreased (Steps 914, 916 and 918) or increased (Steps 920, 922 and 924). The duration of the pulse will be set between a minimum time duration (MINTIME) and a maximum time duration (MAXTIME).

Referring now to FIG. 6B, this portion of the idle algorithm will force the peak-to-valley temperature swing of the cooking medium temperature to be symmetrical about the setpoint temperature. In this respect, it is determined whether the minimum temperature reached is equal to the minimum temperature for the selected control band (Step 926). If so, the peak-to-valley temperature swing is symmetrical. Accordingly, the variables are reset (Step 942) and the heat is turned on for the computed duration (Step 944). If the minimum temperature reached is not equal to the minimum temperature for the selected control band (Step 928) then the temperature at which the pulse of heat is initiated is increased (Steps 930, 932 and 934) or decreased (Steps 936, 938 and 940). The temperature at which the pulse of heat is initiated will be set between a minimum temperature (MINTEMPON) and a maximum temperature (MAXTEMPON).

It should be noted that in a preferred embodiment of the present invention, before performing step 928, it is determined whether the peak-to-valley temperature swings have stabilized about the setpoint temperature. If the swings have stabilized then the algorithm proceeds with step 928. If the swings have not stabilized then the algorithm proceeds with step 942. In this manner, the idle algorithm will not proceed with forcing the peak-to-valley temperature swings to be symmetrical about the setpoint temperature until the peak-to-valley temperature swings have stabilized.

Referring to FIG. 6C, there is shown an algorithm for determining the minimum and maximum temperature excursions of the cooking medium temperature. This algorithm will be executed each time a temperature reading of the cooking medium is taken. The temperature medium of the cooking medium is obtained (Step 950). If the cooking medium temperature exceeds the temperature at which a pulse of heat is initiated (Step 952), then it is determined whether a new maximum temperature has been reached (Step 954). If so, this temperature is saved as the new maximum temperature (Step 956).

If the temperature of the cooking medium is less than or equal to the temperature at which a pulse of heat is initiated (Step 952), then it is determined whether a new minimum temperature has been obtained (Step 960). If so, this temperature is saved as the new minimum temperature (Step 962).

Figure 7:
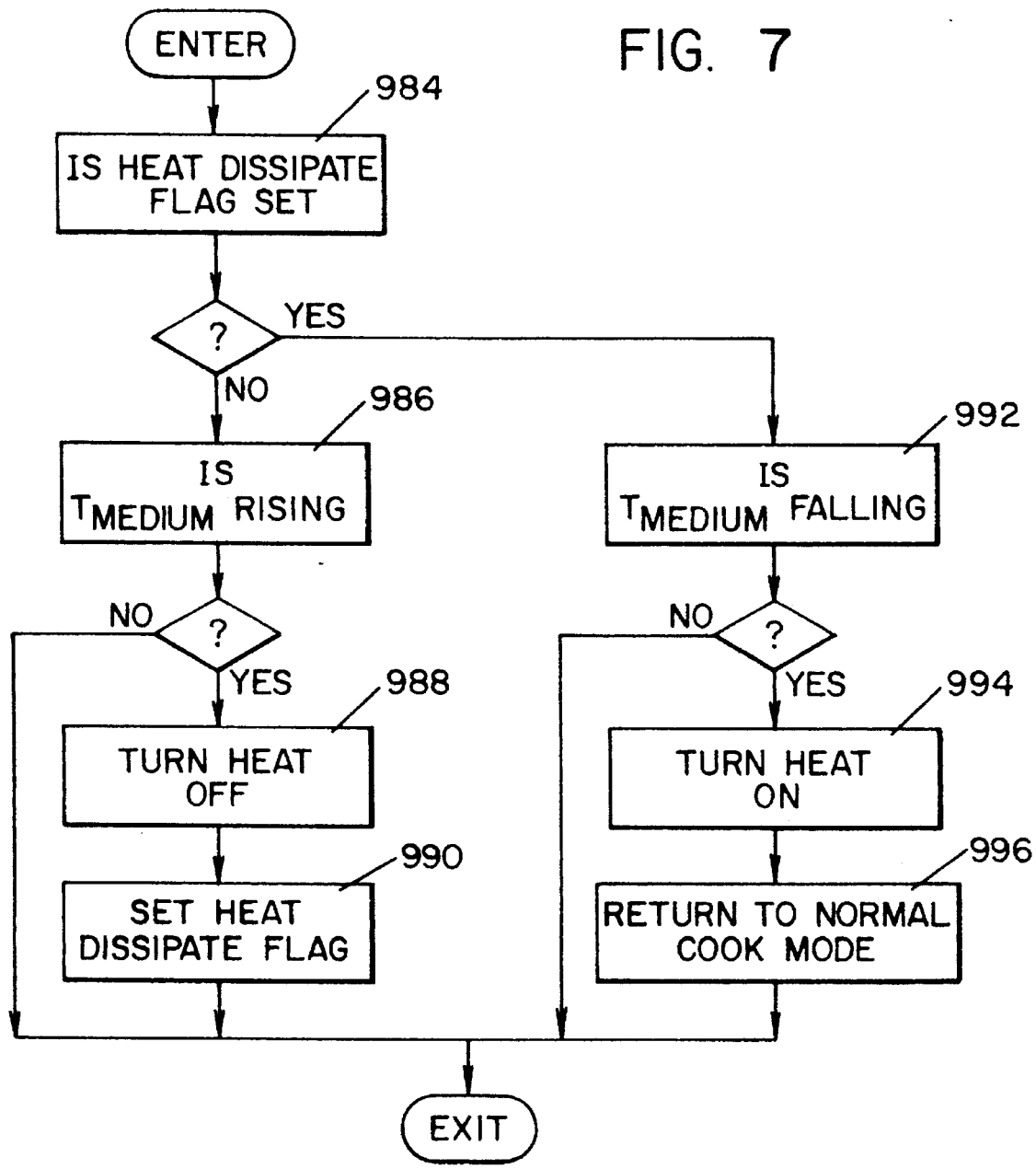
FIG. 7 shows a flow chart for a preferred heat dissipation algorithm.

FIG. 7 discloses a general heat dissipation algorithm for use during the cook mode. It is determined whether a heat dissipate flag has been set (Step 984). If not, the algorithm determines whether the temperature of the cooking medium is rising (Step 986). If the temperature of the cooking medium is rising, then the heat is turned off (Step 988) and the heat dissipate flag is set (Step 990).

If it is determined that the heat dissipate flag is set then it is determined whether the temperature of the cooking medium is falling (Step 992). If so, the heat is turned on (Step 994) and the normal cook mode is resumed (Step 996).

In summary, the heat dissipation algorithm of FIG. 7 will turn off the heat during the cook mode as soon as the temperature of the cooking medium begins to rise. The heat will remain off until the temperature of the cooking medium begins to fall. Once it begins to fall, the heat is turned back on, and a normal cook mode resumes. It will be appreciated that alternatively, the heat can be dissipated at a time later in the cook mode. For instance, the heat could be turned off after the cooking medium temperature has risen to a predetermined temperature and resume heating after the temperature of the cooking medium has dropped a predetermined number of degrees.

It should be noted that the foregoing temperature control operations can be enhanced by saving the operational parameters each time the fryer is used. In this respect, a comparison can be made between current operational parameters and previously saved operational parameters, which are used as default or starting values upon system power up. If the default and current values differ by a significant and programmable amount, then the controller will save the current values in protected memory for use as the new default values. In this manner, the controller can adapt itself to changing conditions to achieve a steady-state condition in the fastest possible time.

Cooking Time Compensation

A second aspect of the present invention relates to time compensation during the cook mode. In this respect, the preferred embodiment of the present invention employs a time compensation curve which relates temperature to a time compensation factor. Time compensation factors for a time compensation curve having a one-for-one time compensation factor at a temperature of 350° F. are stored in memory. Each time compensation factor is stored in an individual memory location. The temperature corresponding to each time compensation factor is used to provide the address of the memory location containing the corresponding time compensation factor. Accordingly, the temperature acts as a pointer to a storage location in memory containing the time compensation factor corresponding to that temperature. The stored compensation factors are used as reference data for determining time compensation factors at various measured cook medium temperatures. It should be noted that the time compensating factors of FIG. 8 have been chosen solely for the purpose of illustration. Accordingly, other time compensation factors from different time compensation curves can be utilized with similar results.

Figure 8:
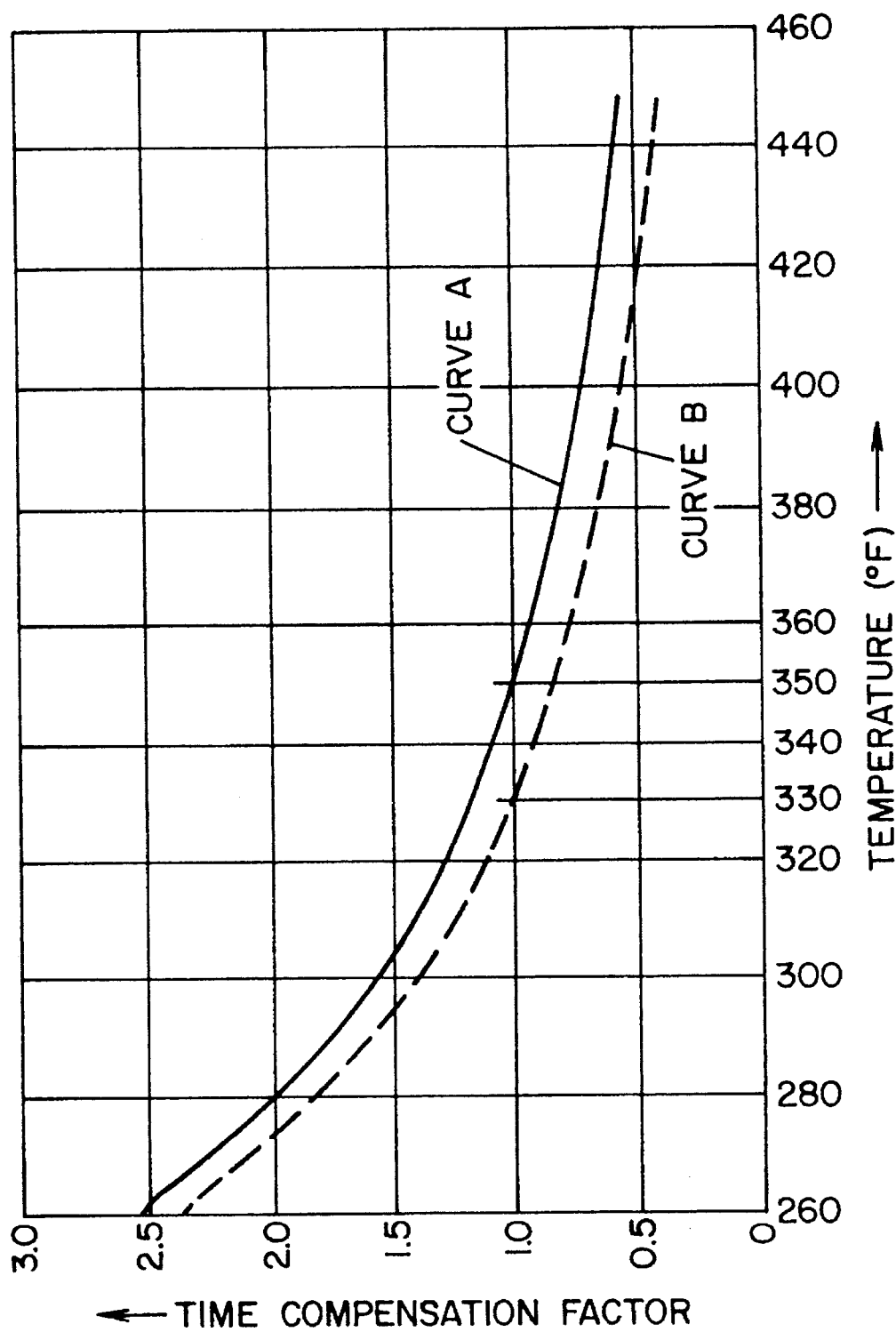
FIG. 8 is a graph showing a time compensation curve for a setpoint temperature of 350° F. and a shifted time compensation curve for a setpoint temperature of 330° F.

In response to selection of a setpoint temperature by an operator, a shift factor is calculated by subtracting the time compensation factor corresponding to 350° F. from the time compensation factor corresponding to the operator selected setpoint temperature. This shift factor is calculated only once for each setpoint temperature selected. Once a cook is initiated, the time compensation factor corresponding to the measured cooking medium temperature is retrieved from the memory, and the retrieved time compensation factor is adjusted by the previously calculated shift factor (i.e., the shift factor is subtracted from the retrieved time compensation factor). The result of this calculation provides the adjusted time compensation factor used to adjust the actual cooking time. FIG. 8 shows a time compensation curve for a setpoint temperature of 350° F. (Curve A) and a shifted time compensation curve for a setpoint temperature of 330° F. (Curve B). A time compensation factor of 1.0 signifies that each second counted by the controller will elapse in one second (i.e., one-for-one time compensation), whereas a time compensation factor of 1.5 signifies that each second counted by the controller will elapse in 1.5 seconds.

One alternative to the foregoing time compensation scheme is to store in memory several sets of time compensation factors from numerous time compensation curves, each having a one-for-one time compensation factor at different temperatures. The set of time compensation factors corresponding most closely with the operator selected setpoint temperature is used for the cook. Accordingly, no shift factor need be calculated. One drawback to this approach is that it requires a relatively large amount of memory.

Another alternative time compensation scheme is to store a set of time compensation factors for a single time compensation curve, but not calculate a shift factor or adjusted time compensation factor. One drawback to this approach is that when the setpoint temperature selected by the operator does not correspond with the stored set of time compensation factors, the operator-programmed cook time will be altered by the time compensation factor associated with the setpoint temperature input by the operator. Accordingly, this approach can lead to confusion of the operator with respect to the desired operator input cook time.

In summary, the present invention provides a system which maximizes the life of heating element components. These elements include relays, contactors, and in the case of gas fired appliances, ignitors and gas valves. Accordingly, the temperature control algorithm for the idle mode of the present invention is particularly well suited for use with other types of heating apparatus, since it provides accurate temperature control, while also extending the life of heating element components. In addition, the present invention also provides a simple, yet accurate system for time compensation during a cook mode.

The foregoing description is a specific embodiment of the present invention. It should be appreciated that this embodiment is described for purposes of illustration only and that numerous alterations and modifications may be practiced by those skilled in the art without departing from the spirit and scope of the invention.

The invention claimed is:

1. A method of operating a control system to classify a medium in a cooking chamber as air or non-air comprising:
   determining a first measured temperature of the medium;
   storing the first measured temperature of the medium;
   activating a heating element to heat said medium for a first predetermined period of time;
   deactivating said heating element for a second predetermined period of time;
   determining a second measured temperature of the medium;
   comparing the first measured temperature of the medium to said second measured temperature;
   classifying the medium as air if said second measured temperature exceeds said first measured temperature by a predetermined amount; and
   controlling the heating element as a function of said classification.

2. A method of operating a control system to control the temperature of a medium in a cooking chamber, said method comprising:
   activating a heating element to heat said medium;
   monitoring the temperature of said medium;
   determining if the temperature of said medium stops rising within a predetermined range of temperatures; and
   controlling said heating element to maintain the medium at a temperature below the temperature at which said medium stopped rising.

3. The method of operating a control system as set forth in claim 2, wherein the temperature at which said medium is maintained is outside the predetermined range of temperatures.

4. The method of operating a control system as set forth in claim 2, wherein the predetermined range of temperatures corresponds to the boiling point of water over normal altitude variations.

5. The method of operating a control system as set forth in claim 4, wherein the predetermined range of temperatures is approximately 200° F.–220° F.

6. A method of operating a control system to classify a medium in a cooking chamber as air, liquid or solid comprising;
   activating a heating element to heat said medium such that the temperature of said medium rises a first preprogrammed amount;
   measuring the time for the temperature to rise said first preprogrammed amount;
   deactivating said heating element;
   measuring the time for the medium temperature to fall a second preprogrammed amount; and
   classifying said medium as air, liquid or solid based upon the total time for the temperature of the medium to rise and fall.

7. A method of operating a control system as defined in claim 6, wherein said system includes means for storing in memory the thermal characteristics of liquid and solid mediums and air, and means for calculating the thermal characteristics of the medium in said cooking chamber from the total time for the temperature of the medium to rise and fall.

8. A control system for controlling the temperature of a medium in a cooking chamber comprising:
   a heater for applying heat to the medium;
   a temperature sensor for sensing temperature of the medium; and
   a controller operatively connected to the heater and the temperature sensor for controlling the amount of heat applied to the medium in two or more modes of operation, wherein in one mode of operation the controller determines if the temperature of the medium stops rising at a temperature indicative of the boiling point of water and automatically changes to another mode of operation wherein the heater is controlled to maintain said medium at a temperature below the temperature indicative of the boiling point of water.

* * * * *

UNITED STATES PATENT AND TRADEMARK OFFICE
CERTIFICATE OF CORRECTION

PATENT NO. : 5,582,755
DATED : December 10, 1996
INVENTOR(S) : Charles A. Maher, Jr. et al It is certified that error appears in the above-indentified patent and that said Letters Patent is hereby corrected as shown below:

On the title page, insert item [62] Related U.S. Application Data:
-- Division of Ser. No. 210,127, Mar. 17, 1994. --

Signed and Sealed this

Eighteenth Day of August, 1998

Attest:

BRUCE LEHMAN

Attesting Officer

Commissioner of Patents and Trademarks